(12) United States Patent
Aspalter et al.

(10) Patent No.: US 6,737,032 B1
(45) Date of Patent: May 18, 2004

(54) METHOD OF INTRODUCING A REACTION MEDIUM INTO A FIRST REACTION MEDIUM FLOWING IN A FLOW CHANNEL AND FOR INTENSIVE MIXING OF THE REACTION MEDIA

(75) Inventors: Ansgar Aspalter, Vienna (AT); Richard Budin, Pfaffstätten (AT); Krzysztof Krotla, Vienna (AT); Christian Lechner, Lafnitz (AT); Robert Reiter, Klosterneuburg (AT); Helmut Wenzl, Vienna (AT)

(73) Assignee: ENVIRGY Environment Energy Engineering and Construction GmbH, Vienna (AT)

( * ) Notice: Subject to any disclaimer, the term of this patent is extended or adjusted under 35 U.S.C. 154(b) by 429 days.

(21) Appl. No.: 09/356,400

(22) Filed: Jul. 16, 1999

(30) Foreign Application Priority Data

Jul. 16, 1998 (AT) .............................................. 1227/98

(51) Int. Cl.$^7$ .............................................. C01B 21/00
(52) U.S. Cl. .................................... 423/235; 423/239.1
(58) Field of Search .............................. 423/235, 239.1

(56) References Cited

U.S. PATENT DOCUMENTS

| | | | | |
|---|---|---|---|---|
| 4,115,515 A | * | 9/1978 | Tenner et al. |
| 4,954,323 A | * | 9/1990 | Sockell |
| 5,465,690 A | * | 11/1995 | Viel Lamare et al. |
| 5,510,092 A | * | 4/1996 | Mansour et al. |
| 5,820,838 A | * | 10/1998 | Tsuo et al. |

* cited by examiner

*Primary Examiner*—Tom Dunn
*Assistant Examiner*—Christina Ildebrando
(74) *Attorney, Agent, or Firm*—Laurence A. Greenberg; Werner H. Stemer; Ralph E. Locher

(57) ABSTRACT

A second reaction medium is introduced into a first reaction medium flowing in a flow channel and the reaction media are intensively mixed. The second reaction medium (which may be one or more reaction media) is introduced at a plurality or even a multiplicity of positions that are distributed over a cross section of the flow channel. Turbulence flow is induced in the first reaction medium (which may also be one or more reaction media) at the positions where the second reaction medium is introduced. As a result, the intense mixing of the reaction media with one another takes place directly at the locations where the second reaction medium is introduced into the flow channel.

8 Claims, 1 Drawing Sheet

METHOD OF INTRODUCING A REACTION MEDIUM INTO A FIRST REACTION MEDIUM FLOWING IN A FLOW CHANNEL AND FOR INTENSIVE MIXING OF THE REACTION MEDIA

BACKGROUND OF THE INVENTION

Field of the Invention

The invention lies in the field of chemical engineering and environmental protection. Specifically, the present invention relates to a method of introducing at least one second reaction medium into at least one first reaction medium flowing in a channel and for intensive mixing of the reaction media with one another.

The present invention relates in particular to a process for the removal of pollutants, especially nitrogen oxides, contained in exhaust gases produced in the firing of fossil fuels or in the incineration of waste. The pollutants are removed by reduction with the use of a catalyst, a reducing agent being introduced into the exhaust gases and being mixed with the exhaust gases. The exhaust gases together with the reducing agent are conducted over the catalyst, as a result of which the pollutants are converted into environmentally neutral gases.

The present invention also relates to a device for carrying out these aforementioned processes.

In chemical process engineering, there is often a need to introduce one or more second reaction media into at least one flowing first reaction medium and to mix the two reaction media intensively with one another within a short distance of travel. This need arises, for example, in the firing of fossil fuels such as coal, oil and gas, and in the incineration of waste, pollutants. The primary noxious gas thereby are nitrogen oxides $NO_x$, which must be removed from the exhaust gases.

It is known, to that end, to introduce a reducing agent into the exhaust gases and then feed the exhaust gases intensively mixed with the reducing agent over a catalytic converter with catalyst material. As a result, the pollutants are converted into environmentally neutral gases. These reactions take place at temperatures of about 150° C. to about 450° C.

By adding $NH_3$ as a reducing agent for example, it is possible to convert NO and $NO_2$ into $N_2$ and $H_2O$.

For this principle in the elimination of $NO_x$ on a catalyst, the following basic reaction kinetics apply:

- adsorption of an ammonia gas molecule on a vanadic acid molecule;
- formation of an ammonium meta-vanadate complex;
- reaction of the ammonium meta-vanadate complex with a nitrogen oxide molecule;
- desorption of the reaction products;
- oxidation of the catalyst into its active initial state with the aid of the oxygen in the exhaust gas.

It is understood in this context that the effectiveness of this process is strongly dependent, on the one hand, on the degree of mixing of the ammonia and nitrogen oxide molecules and, on the other hand, on their uniform distribution throughout the flow of the exhaust gases.

In order to respond to the requirements of mixing with and distributing a reducing agent in the exhaust gases, it is known to design the exhaust gas channel with lances which project into it and are equipped with a multiplicity of nozzles, the individual nozzle lances being supplied individually. However, this further leads to the requirement of providing a sufficiently large spacing between the positions where the reducing agent enters the exhaust gases and the catalyst, in order thereby to achieve the required high degree of mixing of the reaction media with one another. The greater the space between the inlet of the reducing agent and the catalyst, the greater the degree of mixing.

In order to improve the degree of mixing further, it has also been known in the art to provide static mixing devices, such as for example baffle detours and chicanes for deflecting the exhaust gases mixed with the reducing agent, or to arrange heating devices in the exhaust gas channel. These known measures are, however, a disadvantage because on the one hand they entail extra outlay and on the other hand they require extra space.

SUMMARY OF THE INVENTION

It is accordingly an object of the invention to provide a process for introducing at least one second reaction medium into at least one first reaction medium flowing in a channel, which overcomes the above-mentioned disadvantages of the heretofore-known devices and methods of this general type and which provides for improved mixing within a limited space.

With the foregoing and other objects in view there is provided, in accordance with the invention, a method of introducing a second reaction medium into and mixing the second reaction medium with a first reaction medium, which comprises:

conducting the first reaction medium in a flow channel;

introducing the second reaction medium at a plurality of locations strategically distributed about a cross section of the flow channel into the first reaction medium; and inducing turbulence in the first reaction medium at the locations at which the second reaction medium is introduced and thereby intensely intermixing the first and second reaction media directly at the locations at which the second reaction medium is introduced.

In accordance with an added feature of the invention, the second reaction medium is introduced at a multiplicity of locations strategically distributed about the cross section of the flow channel.

In accordance with an additional feature of the invention, the first reaction medium is a pollutant-laden (e.g. nitrogen oxides $NO_x$) exhaust gas produced in a combustion of fossil fuels or an incineration of waste and the second reaction medium is a reducing agent, and the method further comprises, subsequently to the intensely mixing step, conducting the exhaust gas containing the reducing agent through a catalyst and converting the pollutants in the exhaust gas into environmentally neutral gases.

In accordance with another feature of the invention, the inducing step comprises causing reduced pressure and inducing turbulence flows in the first reaction medium at the locations at which the second reaction medium is introduced.

In other words, at least one reaction medium is introduced at a plurality or a multiplicity of positions distributed over a cross section of the flow channel into the at least one first reaction medium. Turbulence flows (such as eddie currents) are induced in the at least one first reaction medium at the positions where the at least one second reaction medium is introduced. The intense mixing of the reaction media with one another therefore takes place directly in the regions where the at least one second reaction medium is introduced.

It is a specific object of the present invention to provide a process for purifying the exhaust gases produced in the burning of materials, as a result of which the outlay on extra devices is kept as low as possible and which guarantees such intensive mixing of the reducing agents with the exhaust gases that the exhaust gases can be fed over a catalyst directly thereafter, without thereby compromising the efficiency of the reduction.

These objects are satisfied in that turbulence is induced in is the exhaust gases containing pollutants in the regions where the reducing agent is introduced. As a result, the required intensive mixing of the exhaust gases with the reducing agent is brought about directly in the regions where the reducing agent is introduced into the exhaust gases.

The turbulence mixing is preferably induced by causing reduced pressure regions and attendant turbulence at the defined locations.

With the above and other objects in view there is also provided, in accordance with the invention, a device for carrying out the above-described method. The novel device comprises:

a flow channel for conducting the first reaction medium containing pollutants in a given flow direction;

an introducing and mixing device (i.e. a reducing agent metering system) formed with a plurality of nozzle apertures for introducing the second reaction medium strategically disposed in the flow channel and a plurality of deflectors projecting transversely to the flow direction of the first reaction medium and operatively associated with the nozzle apertures; and a catalytic converter disposed downstream of the device in the flow direction of the reaction media for catalytically inducing a reaction between the reaction media.

In a preferred embodiment, the flow channel is an exhaust duct conducting exhaust gases originating in a combustion of fossil fuels or an incineration of waste. In that case, the second reaction medium is a reducing agent for reducing the pollutants (e.g. nitrogen oxides) in the exhaust gas.

In accordance with a further feature of the invention, the mixing device comprises a plurality of tubular pieces each having a free end formed with the nozzle apertures, and the deflectors are fastened to the tubular pieces.

In accordance with again an added feature of the invention, the mixing device comprises a plurality of tubes disposed in the flow channel transversely to the given flow direction for feeding the second reaction medium into the channel, and a plurality of tubular pieces fluidically communicating with and projecting from the tubes, the tubular pieces having free ends each formed with at least one of the nozzle apertures, and wherein the deflectors project transversely from the tubular pieces at a location upstream and in vicinity of the at least one nozzle aperture in the given flow direction.

In accordance with again an additional feature of the invention, the tubular pieces enclose an angle of between about 30° and 60°, and preferably of about 45°, with the given flow direction and the deflectors project perpendicularly from the tubular pieces.

In accordance with again a further feature of the invention, the deflectors extend over at least 10% over the area of the cross section of the flow channel.

In accordance with a concomitant feature of the invention, the mixing device includes a plurality of lines disposed in form of a grille and projecting into the flow channel for feeding the second reaction medium, and the tubular pieces formed with the nozzle apertures and the deflectors project from the plurality of lines.

Other features which are considered as characteristic for the invention are set forth in the appended claims.

Although the invention is illustrated and described herein as embodied in a process for introducing at least one second reaction medium into at least one first reaction medium flowing in a channel and for intensive mixing of the reaction media with one another, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
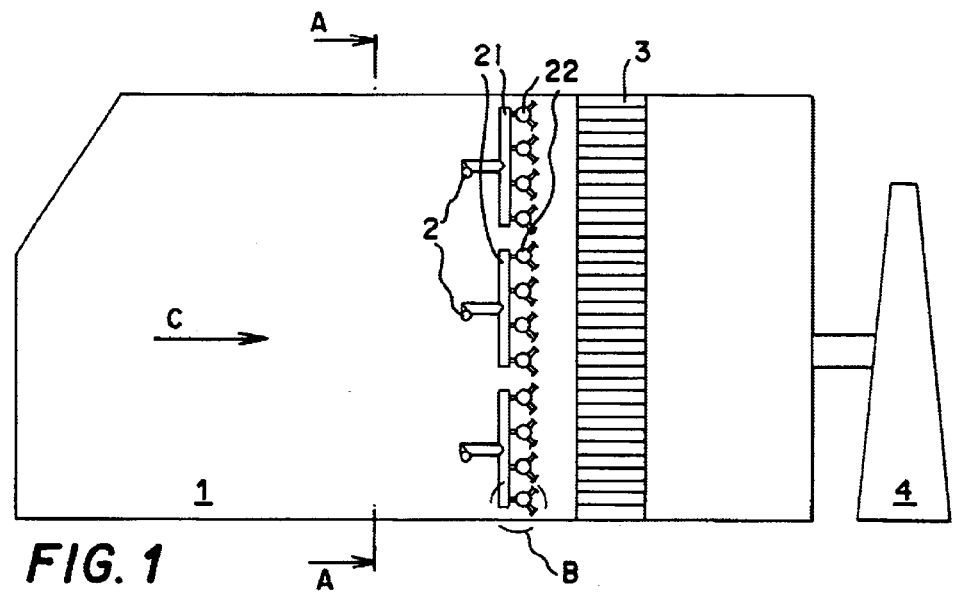
FIG. 1 is a schematic sectional view of an exhaust gas channel.
Figure 2:
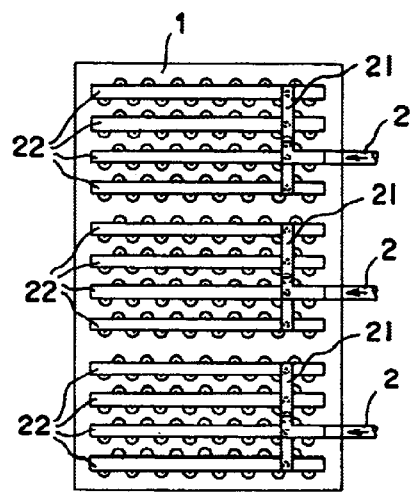
FIG. 2 is a sectional view of the exhaust gas channel taken along the line II—II in FIG. 1.

Referring now to the figures of the drawing in detail and first, particularly, to FIGS. 1 and 2 thereof, there is seen a conduit or flow channel 1 into which exhaust gases from the combustion of fossil fuels or wastes are fed from a combustion chamber. The exhaust gases flow through the flow channel 1 in the direction of the arrow C. The flow direction C substantially coincides with the longitudinal axis of the flow channel 1. Since these exhaust gases contain a multiplicity of pollutants, in particular nitrogen oxides, they must undergo purification. The exhaust gases flowing into the channel are at a temperature of 150° C. to 450° C.

Figure 3:
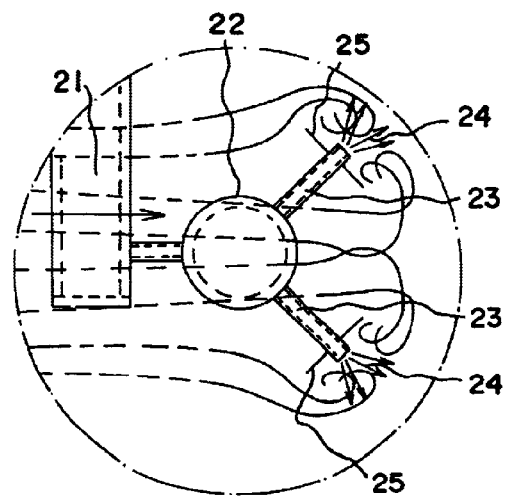
FIG. 3 is a side view of detail III in FIG. 1, on an enlarged scale.

A plurality of feed lines 2 project into the channel 1 and are followed by first distributor tubes 21 from which second distributor tubes 22 lead off. As can be seen from FIG. 3, tubular sections 23, whose free ends are designed as nozzle apertures 24, project from the distributor tubes 22. From the nozzle apertures 24, reducing agents supplied via the distributor tubes 21 and 22 are introduced into the exhaust gases flowing through the channel 1. Further, transversely projecting deflectors 25 are fastened to the tubular pieces 23, upstream of the nozzle apertures 24 as viewed in the flow direction C.

Due to the fact that the deflectors 25 are aligned transversely with respect to the flow C of the exhaust gases, they respectively give rise, on their side away from the flow direction, to a region in which a reduced pressure is produced. As a result, strong turbulence of the exhaust gases is induced in the region where the reducing agent enters the exhaust gas flow. This leads to intensive mixing of the exhaust gases with the reducing agent. Since, as a result of this, the exhaust gases are optimally mixed with the reducing agent, they can be fed over a catalytic converter 3 directly thereafter. Since the pollutants are converted into environmentally neutral gases at the catalytic converter 3, the exhaust gases can be discharged to the free atmosphere via a flue stack 4 that follows the purification system in the flow direction.

It is understood that the invention provides for a process and a device with which optimum mixing of the reaction media is brought about, without extra mixing devices needed to be provided to that end, and in which the mixing path can be is very short without the efficiency of the desired reaction being compromised by the system.

In particular, a process and a device have been provided with which optimal purification of exhaust gases is brought about, without mixing devices needed to be provided for that purpose in the exhaust gas channel, and in which the catalyst can be arranged very near to the nozzle apertures for the introduction of the reducing agent, without the efficiency of the purification being compromised by this.

We claim:

1. A method of introducing a second reaction medium into and mixing the second reaction medium with a first reaction medium, which comprises:

conducting a first reaction medium in a flow channel;

introducing a second reaction medium through nozzle apertures at a multiplicity of locations distributed about a cross section of the flow channel into the first reaction medium; and causing reduced pressures and inducing turbulence flows with a multiplicity of deflectors in the first reaction medium at the locations at which the second reaction medium is introduced and thereby intensely intermixing the first and second reaction media directly at the locations at which the second reaction medium is introduced.

2. The method according to claim 1, wherein the second reaction medium is introduced at a multiplicity of locations evenly distributed about the cross section of the flow channel.

3. The method according to claim 1, wherein the first reaction medium is a pollutant-laden exhaust gas produced in a combustion of fossil fuels or an incineration of waste and the second reaction medium is a reducing agent, and the method further comprises, subsequently to the intensely mixing step, conducting the exhaust gas containing the reducing agent through a catalyst and converting the pollutants in the exhaust gas into environmentally neutral gases.

4. The method according to claim 3, wherein the pollutants contained in the exhaust gas are nitrogen oxides.

5. The method according to claim 1, which comprises disposing at least one of the deflectors in close vicinity of each of the nozzle apertures and intermixing the first and the second reaction media with the deflectors directly at the nozzle apertures.

6. The method according to claim 5, which comprises disposing the deflectors symmetrically about the nozzle apertures relative to a flow direction of the second reaction medium.

7. A method of introducing a second reaction medium into and mixing the second reaction medium with a first reaction medium, which comprises:

conducting a first reaction medium in a flow channel;

providing a multiplicity of nozzle apertures distributed about a cross section of the flow channel, each of the nozzle apertures having a respective one of a multiplicity of deflectors disposed in close vicinity thereto;

introducing a second reaction medium through the nozzle apertures at the multiplicity of locations into the first reaction medium; and causing reduced pressures and inducing turbulence flows with the multiplicity of deflectors in the first reaction medium directly at the locations at which the second reaction medium is introduced, for intensely intermixing the first and second reaction media directly at the multiplicity of locations at which the second reaction medium is introduced.

8. The method according to claim 7, wherein the first reaction medium is an exhaust gas containing nitrogen oxides and flowing in an exhaust gas channel, the second reaction medium is a reducing agent, and the method further comprises reducing the nitrogen oxides by reacting the reducing agent in the exhaust gas.

* * * * *